United States Patent
Forberg

[11] 3,918,675
[45] Nov. 11, 1975

[54] FLOW REGULATING DEVICE PARTICULARLY FOR INFUSION AND TRANSFUSION TUBES

[75] Inventor: Hans-Jürgen Forberg, Lensahn, Holst, Germany

[73] Assignee: Transcodan, Germany

[22] Filed: Aug. 24, 1973

[21] Appl. No.: 391,133

[30] Foreign Application Priority Data
Aug. 30, 1972 Germany.............................. 2242539

[52] U.S. Cl........................................ 251/6; 251/4
[51] Int. Cl.².......................................... F16K 7/06
[58] Field of Search................................... 251/4–10

[56] References Cited
UNITED STATES PATENTS

| | | | |
|---|---|---|---|
| 2,595,511 | 5/1952 | Butler | 251/6 |
| 3,189,038 | 6/1965 | Von Pechmann | 251/6 X |
| 3,625,472 | 12/1971 | Rychlik | 251/6 |
| 3,685,787 | 8/1972 | Adelberg | 251/6 |
| 3,730,478 | 5/1973 | Burke | 251/8 |
| 3,802,463 | 4/1974 | Dabney | 251/6 X |

Primary Examiner—Martin P. Schwadron
Assistant Examiner—Richard Gerard
Attorney, Agent, or Firm—McGlew and Tuttle

[57] ABSTRACT

A device for regulating the rate of flow in a flexible tube, particularly for infusion and transfusion apparatus, comprises a tube receiver which has a longitudinally extending clamping surface overwhich the tube to be clamped is positioned. A clamp member for example, a roller is guided for movement over the clamping surface on a guide track to bring the clamping member into close proximity to the clamping surface and to move it along the surface. The construction includes a groove defined in either the clamping surface itself or the clamping member which tapers inwardly in the direction of clamping movement and which accommodates the flexible tube during the clamping operation. A small loop or overhang portion of the tube forms in the groove as the clamping action is increased by movement of the clamping member over the tube along the clamping surface so that progressive movement of the clamping member reduces the size of the loop of the hose until it is eventually flattened completely and completely closed off.

11 Claims, 11 Drawing Figures

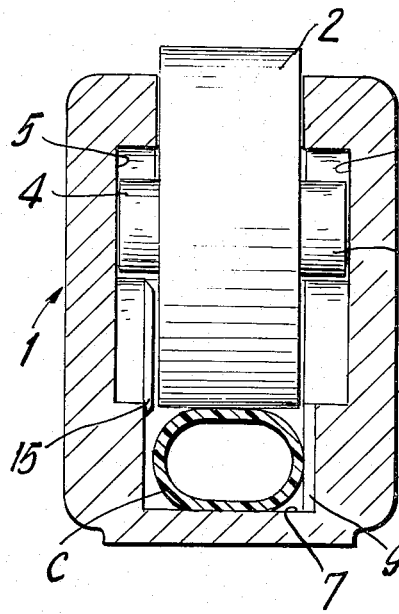
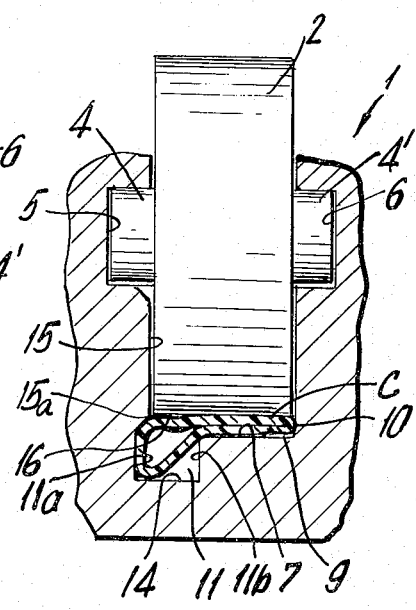
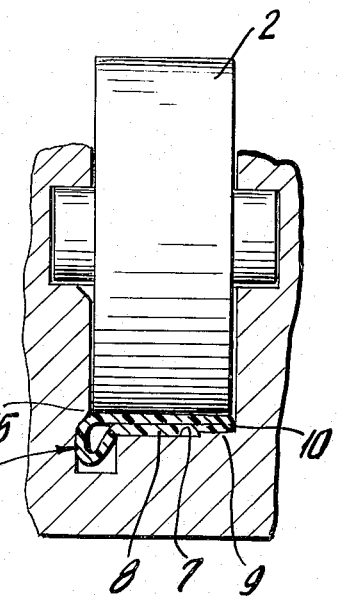
FIG. 7   FIG. 8   FIG. 9
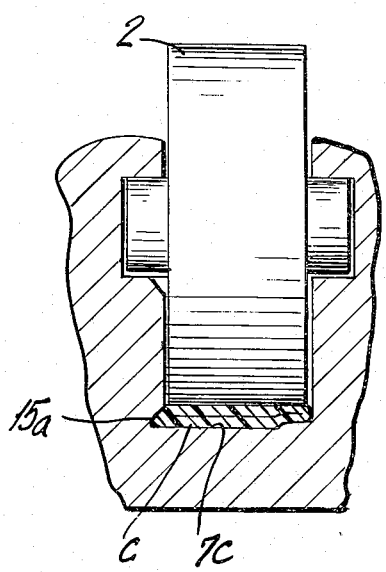
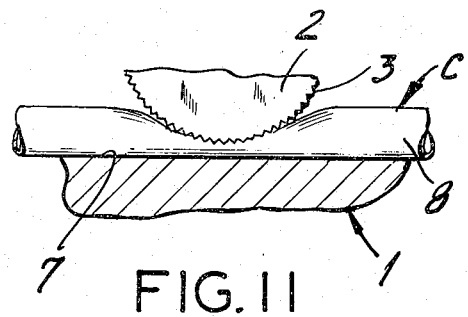
FIG. 10   FIG. 11

FLOW REGULATING DEVICE PARTICULARLY FOR INFUSION AND TRANSFUSION TUBES

BACKGROUND OF THE INVENTION

1. Field of the Invention

This invention relates in general to the construction of tube flow regulating devices and, in particular, to a new and useful clamp for regulating the flow in a flexible tube, particularly for infusion and transfusion apparatus.

2. Description of the Prior Art

Clamps are known which include a clamping body which has two longitudinally directed raised faces and a longitudinally directed central grooved face between the two raised faces. The flexible tube bears on the raised faces and the inner edges of the raised face can converge in the direction of the clamp body. The lateral parts of the clamp body are provided with guide slots for the clamping means. The guide slots are inclined relative to the raised faces and the grooved face. The clamping means comprise a roller which is provided on both sides with axle journals which run in guide slots carried by the clamping body on each side thereof. The flexible tube is compressed by the clamping means more in the lateral regions than in the central part, so that the flow variations are reduced with a corresponding setting of the device. The groove defined between the raised faces varies in depth in the direction of the clamped body. Depending upon the position of the clamping means, the flexible tube is differently compressed so that its free end cross section can be adjusted as desired. In this device there is a risk that if it is set to a certain cross section of the flexible tube, the cross section of the tube will change after a short period of use. This can result in an initial stressing of the clamping means. Thus, it can happen that during the time of an infusion, the rate of flow which is set by the clamp will change under otherwise constant conditions. There is a risk that the tube or the hose part which is opposite to the tube parts adjoining the groove will change its position, since it can move freely in the direction of the interior of the tube. Its position can change, for example, in dependence on the pressure inside the flexible tube. Even minor changes in the free cross section can result in a considerable variation of the rate of flow.

SUMMARY OF THE INVENTION

The invention provides a device for regulating the rate of flow in a tube so that once the rate of flow is set it will remain constant for a long period of time and will not change by itself so that constant supervision of the rate of flow once it has been set by personnel of a hospital, for example, will no longer be necessary.

In the preferred form of the invention, the device for regulating the rate of flow in a flexible tube comprises a tube receiver which has a longitudinally extending clamping surface over which the tube to be clamped is positioned. A clamp member, for example, a cylinder or disk is adapted to move over the clamping surface and it advantageously includes axles which extend into guide grooves overlying the clamping surface and are constructed to bring the peripheral surface of the clamping member into association with the clamping surface for movement along the clamping surface. The particular feature of the invention is the provision of a grove either on the clamping surface or on the clamp member which extends along one side of the clamping surface and is tapered inwardly in the direction of clamping movement so that it narrows to an end position in which the tube will be fully clamped. The clamp of the invention is of very simple design and is therefore easy to manufacture and its handling and maintenance are simple also. In particular, the invention has the advantage of a clamp which when set in any position, does not change this position so that the rate of flow through a flexible tube once it has been set will remain constant over a long period of time. The clamp of the invention does not have to be reset even if it is made of a plastic part which tends to have a cold flow characteristic. The effect of the clamp according to the invention, is due to the fact that the flexible tube is completely compressed over a selected area range depending upon the position of the clamp while the free part of the flexible tube is held under its own stress in a position which does not change even over a longer period of time. The free tube cross section can be adjusted by displacing the clamp or the clamp holder. The wider the groove in the range of the clamping surface of the clamping means, the greater the free cross section of the tube. The groove can be arranged in the clamping surface of the clamp holder and it can also be arranged in the clamping surface of the movable clamping means especially when the movable clamping means is other than a rotatable roller. Even with a roller, the groove can be dimensioned alongside of the roller so that it tapers to a small dimension in the direction of advance of the roller.

In accordance with another feature of the invention, the side wall of the groove adjoining the clamping surface can extend in a right angle to the clamping surface. In some instances, both side walls of the groove can be formed parallel to each other. These embodiments have the advantage that no projecting parts of the side walls of the groove of the clamped body can act on the flexible tube in the range of the groove. It is also possible to construct the clamping body so that the body is tubular in form and includes side walls overlying each side of the clamping surface which may be displaced either inwardly or outwardly. When the walls are displaced outwardly an additional space is formed laterally of the limiting wall of the clamping means in the clamp holder which accommodates the flexible tube during the clamping operation and without hindering any parts of the remaining portion of the tube.

The construction of the clamp is such that the groove along the clamping surface is of a depth so that the flexible tube does not bear in any clamping position on the base of the groove. This means that the portion of the flexible tube in the groove will be uncompressed in all directions and can bend freely. In accordance with another feature of the invention the clamping surface on the side opposite the groove is provided with a step extending over the entire length of the clamping surface. The flexible tube or hose is thus particularly compressed in the range of the tube break on the side of the compressed tube part so that the formation of fine channels in the range of the tube break can be positively prevented. The clamping surface can also be designed so that it does not extend over the entire length of the displacement of the clamping member. Accordingly, the flexible tube or hose can open fully in the displacement range of the clamp in which a clamping surface does not oppose the latter. In this way the roller clamp permits the opening of the tube to the full cross section.

According to another feature of the invention, the limiting edge between the side wall of the groove and the clamping surface can extend in different angles to the opposing side wall of the groove proceeding in the direction of the displacement of the clamping member. Thus the groove does not taper uniformly over its entire length but tapers initially rapidly starting from its greater width toward the other end of the groove. The angle which the edge forms between the side wall of the groove and the clamping surface relative to the other side of the groove, can be smaller over the remaining portion of the tapered part of the groove so that the groove tapers more slowly in the last part of movement of the clamping member. This results in a range of displaceability which permits a very fine regulation in the low flow rate range.

The clamping member itself or the clamping surface may be knurled or milled transverse to the direction of the displacement of the two parts, and such knurling makes it possible to achieve a high surface pressure. The groove which is defined in either the clamping surface or in the clamping member's periphery, may terminate short of the whole displacement of the clamping member so that the hose will be fully compressed in such areas when it is engaged. In the interest of stability of the clamp, the depth of the groove can decrease in the direction of its taper.

The guideways for facilitating the holding of the clamping member can be provided with a widening at the inlet opening of the clamping device so that the clamping means can yield opposite to the direction of the clamping surface. This facilitates the introduction of the flexible tube or hose into the clamp body.

Accordingly, it is an object of the invention to provide a device for regulating the flow through a flexible tube particularly one for infusions and transfusions and which includes a body portion or tube receiver portion having a longitudinally extending clamping surface over which the tube to be clamped is positioned and a clamp member which is adapted to move over the clamping surface and which is guided by guide means over the surface so as to compress a tube thereon therebetween and wherein at least one of the clamping surfaces or the surface of the clamping member is provided with a groove adjacent an edge thereof which extends longitudinally along the of movement of the clamping member and tapers inwardly in the direction of movement of the clamping member.

A further object of the invention is to provide a clamping device which permits a fine regulation of the flow of fluid therethrough and which is simple in design, rugged in construction and economical to manufacture.

For an understanding of the principles of the invention, reference is made to the following description of typical embodiments as illustrated in the accompanying drawings.

BRIEF DESCRIPTION OF THE DRAWINGS

In the drawings:

FIG. 7 is a vertical section taken along the line E–F of FIG. 2;

FIG. 8 is a vertical section taken along the line G–H of FIG. 2;

FIG. 9 is a vertical section taken along the line K–I of FIG. 2;

FIG. 10 is a vertical section taken along the line M–N of FIG. 2; and

FIG. 11 is a partial side elevational view of the clamping roller engaged on the tube to be clamped.

GENERAL DESCRIPTION OF THE PREFERRED EMBODIMENTS

Figure 2:
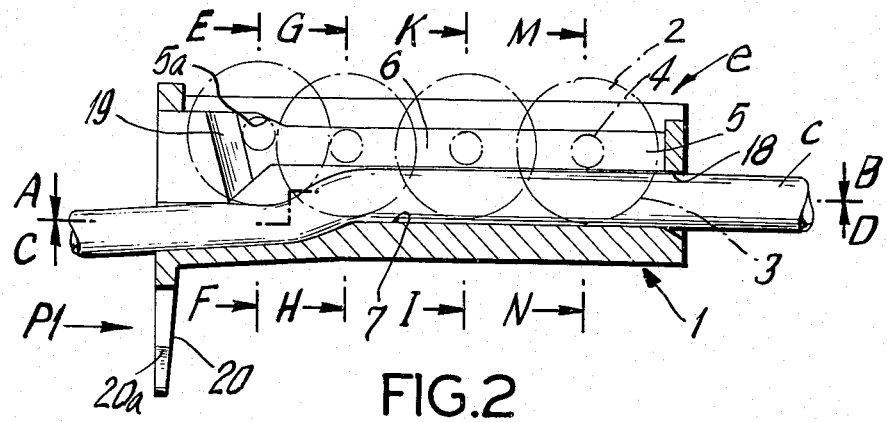
FIG. 2 is a longitudinal sectional view of a roller clamp constructed in accordance with the invention.
Figure 1:
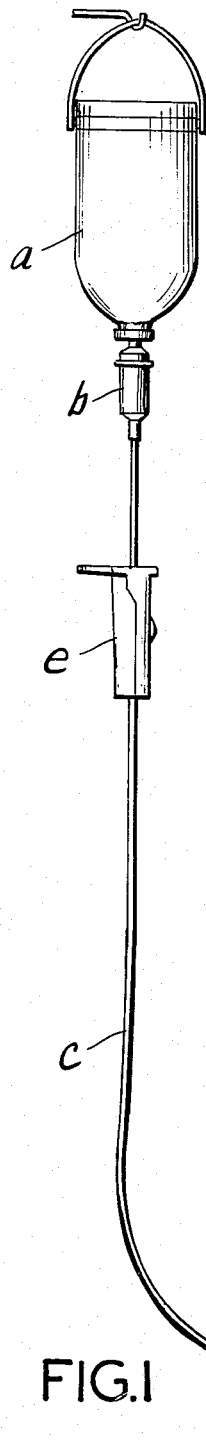
FIG. 1 is a side elevational view of an infusion apparatus having a roller clamp constructed in accordance with the invention.

Referring to the drawings in particular, the invention embodied therein comprises a medical infusion device which includes a suspended bottle $a$ having a drip chamber $b$ from which a flexible tube or hose $c$, for example, of plastic, leads to an injection canule $d$. In accordance with the invention, the tube $c$ is provided with a clamp $e$ with which the rate of flow is adjusted.

In accordance with the invention the clamp holder $e$ includes a clamp body or receiver 1 which, in the embodiment illustrated, is tubular and which includes an interior clamping surface 7 over which the tube $c$ is positioned. A clamping member 2 which, in this embodiment, comprises a roller, includes an axle portion 4 and 4' which extends outwardly from respective sides and is engaged in guide grooves 5 and 6 respectively which are formed in side walls of the receiver 1 as shown in FIG. 7. Preferably either the surface 7 or the peripheral surface 3 of the clamping roller 2 is knurled. The guide grooves 5 and 6 for the shaft portions 4 and 4' advantageously extend parallel to a major portion of the surface 7 but have openings or an upward taper 5a at one end which permit the gradual infeeding of the clamping roller 2. The clamping surface 7 only extends up to the range of the section represented in FIG. 8 but the body 1 includes a widened entrance surface 7' which accommodates the full diameter of the tube $c$. At the start of the regulating zone over which the clamping surface 7 is effective which begins in the range of the section represented in FIG. 8, the distance between the clamping surface 7 and the surface 3 of the roller is less than double the wall thickness of the flexible tube 8 so that a complete clamping action can be obtained. In the embodiment shown, the distance between the surface 3 of the clamping member or roller 2, and the clamping surface 7 remains constant over the entire displacement zone or longitudinal length of the clamping surface 7. This area extends approximately from the section designated G–H to the section designated M–N. When the clamping member 2 is displaced between these points, the tube part between the clamping surface 3 and the receiving surface 7 remains closed. Yeilding of the tube 7, for example because of cold flow is practically non-existent.

Along one lateral edge of the clamping surface 7, the side walls are provided with an inwardly extending step 9 which reduces the distance between the clamping surface 7 and the surface 3 of the roller and ensures the clamping of the flexible tube in the range of the tube break 10 shown in FIG. 8. The step 9 may advantageously extend over the entire length of the regulating zone. Due to the knurling of the surface 3 of the roller 2, as shown in FIG. 11, there is a high uniform surface pressure in this displacement zone because of the constant distance between the roller surface and the clamping surface but nevertheless the accessibility of the displacement roller is maintained.

Figure 5:
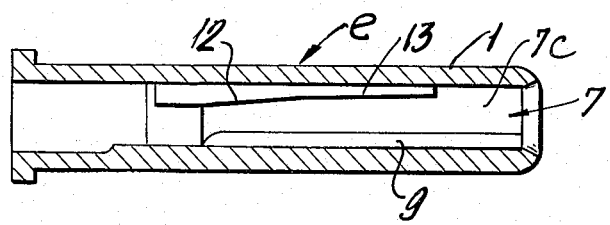
FIG. 5 is a horizontal section taken along the line A–B of FIG. 2.
Figure 6:
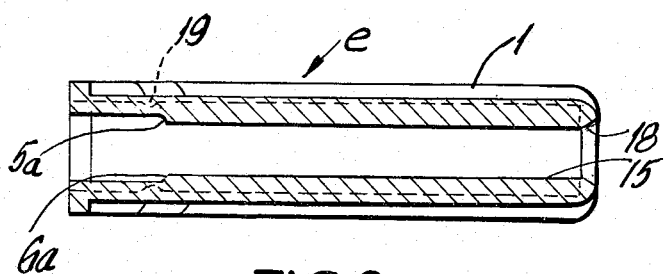
FIG. 6 is a horizontal section taken along the line C–D of FIG. 2.

On the side opposite the step 9, the clamping surface 7 is provided with a groove 11 which extends downwardly from the surface and includes side walls 11a and 11b which extend at right angles to the clamping surface 7. The cross section of the groove tapers inwardly in the direction of the arrow P1, i.e. in the direction of movement of the clamping member 2 to close the tube. The cross section of the groove does not taper uniformly but rather it includes an intermediate portion 12 having a wide angle taper which is much greater than the taper of a remaining portion 13 as shown in FIG. 5. The angle of inclination of the edge varies substantially in the range of the section taken along the line K–I shown in FIG. 9.

The groove 11 includes a base wall 14 which is deeper than the loop of tubing c which will be directed into the groove during the compressing action as shown in FIGS. 8 and 9. The arrangement of the groove and its design is such that no cross sectional variations by cold flow of the plastic material of the hose can appear in the range of the uncompressed flexible tube c. Readjustment of the clamping member or roller 2 does not hinder the free cross section of the partly clamped off flexible tube. The remaining free cross section for the flow is determined solely by the clamping of the elastic tube part.

For the further uncontrollable reduction of the influence area of the tube cross section, the side wall 11a is displaced to the outside relative to the side wall 15 of the receiver 1. In this way there is a laterally extending portion of the groove which accommodates the tube so that the roller 2 can act only in the free portion of the groove on the flexible tube. The inclined terminal surface 15a between the wall 15 and the inner wall 11a detaches the tube from the free surface 16 of the roller 2. The increase of the cross section by swelling of the flexible tube into the groove, due to the constant pressure between the roller and the clamping surface, as well as the reduction of the cross section by sagging of the rollers, is compensated by the laterally extending portion of the groove 11.

In order to achieve clamping of the plastic tube c in the end position of the roller 2, the groove 11 does not extend over the entire length of the displacement range of the roller. Rather the clamping portion 7c of the whole clamping surface 7 is such that there is a complete compression of the tube c as shown in FIG. 10.

Figure 4:
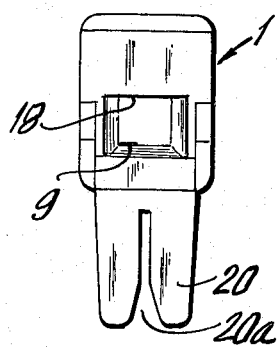
FIG. 4 is a rear view of the roller clamp shown in FIG. 2 taken in the direction of the arrow P2.

In order to facilitate the introduction of the plastic tube c into the clamping housing, the housing is provided with a rear opening 18 as shown in FIG. 4, which is provided with facets or beveled edges. The guide slots 5 and 6 are also provided with outwardly extending portions 5a and 6a for the same purpose. Inclined guide ribs 19 are also arranged in the front end so that the roller 2 can yield in the front position and move upwardly to release the opening of the plastic tube c. The raised guide ribs 19 secure the roller 2 against falling out.

Figure 3:
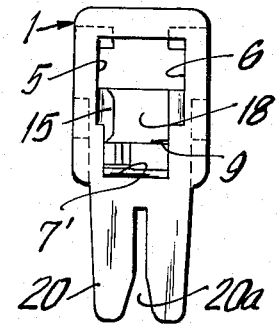
FIG. 3 is a front view of the roller clamp shown in FIG. 2 taken in the direction of the arrow P1.

In the front part of the clamp holder is arranged a tongue 20 which extends downwardly or outwardly from one side and is provided with a slot 20a shown in FIGS. 3 and 4, into which the tube c may be positioned when the transfusion or infusion process is interrupted. The flexible tube c can be closed off completely by insertion into this slot without the roller having to be adjusted.

While specific embodiments of the invention have been shown and described in detail to illustrate the appplication of the principles of the invention, it will be understood that the invention may be embodied otherwise without departing from such principles.

What is claimed is:

1. A device for regulating the rate of flow in a flexible tube particularly for infusion and transfusion apparatus, comprising a tube receiver having a longitudinally extending clamping surface over which the tube to be clamped is positioned, a clamp member adapted to move over the clamping surface, guide means adjacent said clamping surface engaged with said clamp member and guiding said clamp member for movement in close proximity with the clamping surface along said clamping surface, at least one of said clamping surface and said clamp member peripheral surface having a groove adjacent an edge thereof extending longitudinally along its length and tapering inwardly in the direction of clamping member movement and defining an edge of an effective clamping surface which varies longitudinally between the ends of said groove, the tube to be clamped being positionable on the clamping surface and extending with a portion thereof into said groove, the portion of the tube to be clamped which is in said groove being reduced in cross section during the movement of the clamping member and the remaining portion of the tube to be clamped being positioned between the clamping member and the clamping surface so as to be clamped by the clamping member in a substantially flattened position, said tube receiver including side walls on each side of said clamping surface arranged directly adjacent each side of said clamping member, said groove having at least a portion thereof below said clamping surface extending away from said surface beyond the adjacent said side wall forming an overhanging portion of said side walls over said groove.

2. A device according to claim 1, wherein the overhanging portion of the side wall on said groove is provided with a beveled end face.

3. A device according to claim 1, wherein the clamping surface does not extend over the entire length of displacement of the clamping member.

4. A device according to claim 1, wherein said groove extends along a major portion of said clamping surface and it has a tapered portion forming a gradually reducing cross section which accommodates a gradually reducing area of said flexible tube.

5. A device according to claim 1, wherein said clamping surface has said groove, said groove being bounded by a side wall on the side adjacent the clamping surface which extends at a right angle to the clamping surface.

6. A device according to claim 1, wherein said clamping surface has said groove, said groove having a side wall on each side which extend substantially parallel to each other and at right angles to said clamping surface.

7. A device according to claim 1, wherein said clamping surface has said groove on one side and has an opposite side provided with a raised step extending over the entire length of its clamping surface.

8. A device according to claim 1, wherein said groove has an intermediate section with at least one side wall tapering inwardly at a different taper from the remaining section.

9. A device according to claim 1, wherein at least one of said clamping member and said clamping surface is knurled.

10. A device according to claim 1, wherein said clamping surface has said groove, said groove being of a lesser length than said clamping surface.

11. A device according to claim 1, wherein said groove has a depth which decreases in the direction of its taper.

* * * * *